United States Patent
Calvarese (10) Patent No.: US 7,764,488 B2
(45) Date of Patent: Jul. 27, 2010

(54) WEARABLE COMPONENT WITH A MEMORY ARRANGEMENT

(75) Inventor: Russell Calvarese, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 498 days.

(21) Appl. No.: 11/738,643

(22) Filed: Apr. 23, 2007

(65) Prior Publication Data

US 2008/0259552 A1 Oct. 23, 2008

(51) Int. Cl.
*G06F 1/16* (2006.01)

(52) U.S. Cl. .................. 361/679.03; 224/930

(58) Field of Classification Search ............ 361/679.03; 224/930
See application file for complete search history.

(56) References Cited

U.S. PATENT DOCUMENTS

| | | | | | |
|---|---|---|---|---|---|
| 4,412,106 | A * | 10/1983 | Pavel | .......................... | 381/309 |
| 5,305,181 | A * | 4/1994 | Schultz | .................. | 361/679.03 |
| 5,491,651 | A * | 2/1996 | Janik | ..................... | 361/679.03 |
| 5,555,490 | A * | 9/1996 | Carroll | .................. | 361/679.03 |
| 5,774,338 | A * | 6/1998 | Wessling, III | ............... | 361/730 |
| 6,137,675 | A * | 10/2000 | Perkins | .................. | 361/679.03 |
| 6,529,372 | B1 * | 3/2003 | Ng et al. | ................. | 361/679.03 |
| 6,583,982 | B2 * | 6/2003 | Mancini et al. | ......... | 361/679.03 |
| 6,726,070 | B2 * | 4/2004 | Lautner | ....................... | 224/221 |
| 6,734,842 | B2 * | 5/2004 | Woodmansee et al. | ...... | 345/169 |
| 6,754,069 | B2 * | 6/2004 | Harada | ................... | 361/679.03 |
| 6,757,156 | B2 * | 6/2004 | Adams et al. | .......... | 361/679.03 |
| 6,962,277 | B2 * | 11/2005 | Quintana et al. | ............ | 224/262 |
| 7,039,742 | B1 | 5/2006 | Lada et al. | | |
| 2002/0099865 | A1 | 7/2002 | Fukumori et al. | | |
| 2003/0002243 | A1 * | 1/2003 | Newman et al. | ............ | 361/683 |
| 2003/0071791 | A1 | 4/2003 | Hanson et al. | | |
| 2005/0111174 | A1 * | 5/2005 | Jordan | ........................ | 361/681 |

FOREIGN PATENT DOCUMENTS

EP 1 225 501 7/2002

* cited by examiner

*Primary Examiner*—Lisa Lea-Edmonds (57) ABSTRACT

A system may include (a) a holder including a wearable component, (b) a dock coupled to the wearable component; (c) a memory coupled to the dock; and (d) a computing device removeably coupled to the dock. The computing device receives from and stores data to the memory. The data is capable of causing the coupled computing device to automatically adopt a mode of another computing device coupled to the dock at a different time.

28 Claims, 6 Drawing Sheets

WEARABLE COMPONENT WITH A MEMORY ARRANGEMENT

FIELD OF THE INVENTION

The present invention relates generally to wearable mobile computers.

BACKGROUND

Wearable mobile computers typically have an inexpensive wearable component that is issued to an employee and used only by the particular employee or group of employees. Often this is done for hygiene issues or to address special employee functions. Mobile computers typically are worn on a type of wearable component (e.g. straps, belts, headsets, etc.), and may be attached and removed from these components as they are required by the user.

SUMMARY OF THE INVENTION

The present invention relates to a system which may include (a) a holder including a wearable component, (b) a dock coupled to the wearable component; (c) a memory coupled to the dock; and (d) a computing device removeably coupled to the dock. The computing device receives from and stores data to the memory. The data is capable of causing the coupled computing device to automatically adopt a mode of another computing device coupled to the dock at a different time.

DETAILED DESCRIPTION

The present invention may be further understood with reference to the following description and the appended drawings, wherein like elements are referred to with the same reference numerals.

Figure 1A:
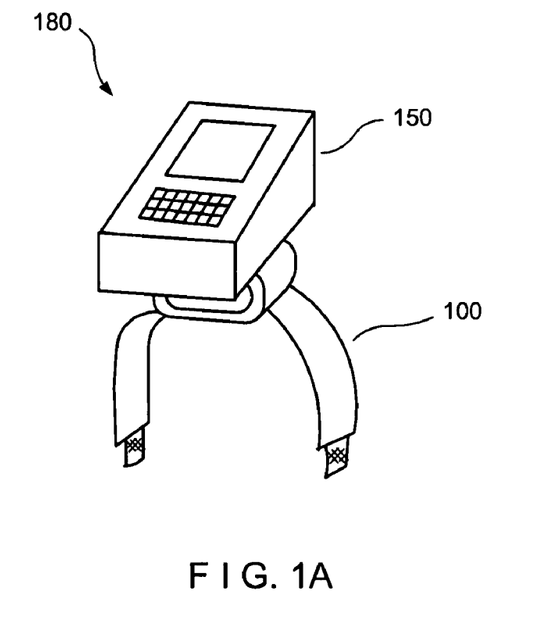
FIGS. 1A and 1B show an exemplary embodiment of a system according to the present invention.
Figure 1B:
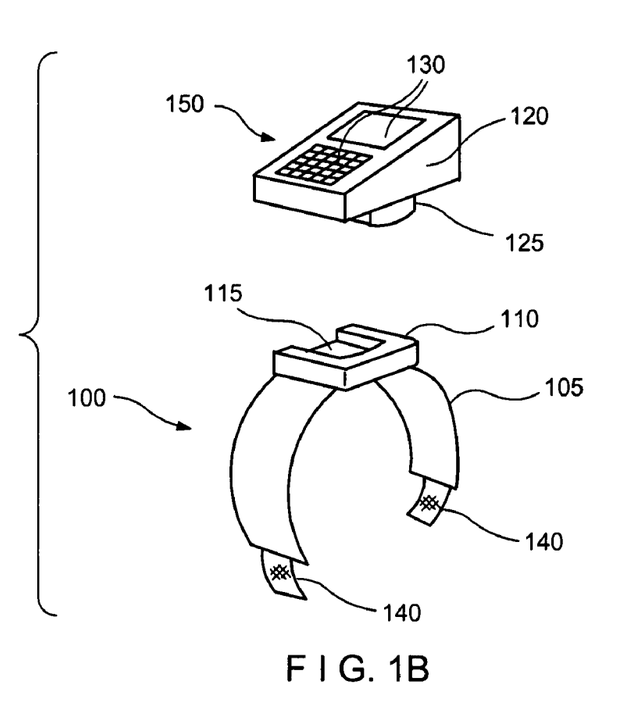

FIG. 1A shows an exemplary embodiment of a system 180, in a coupled state, comprising a smart holder 100 and a mobile computer 150 coupled thereto. FIG. 1B shows system 180 in a decoupled state. With reference to FIGS. 1A and 1B, an exemplary holder 100 according to the present invention comprises a wearable component 105 and a dock 110 integrally attached thereto. An exemplary mobile computer 150 according to the present invention comprises a housing 120, an attachment component 125, and a data-input arrangement 130. To achieve the system of FIG. 1A, dock 110 permits attachment component 125 to couple to holder 100. In a coupled state, system 180 may immediately begin operating as a single device.

Figure 2:
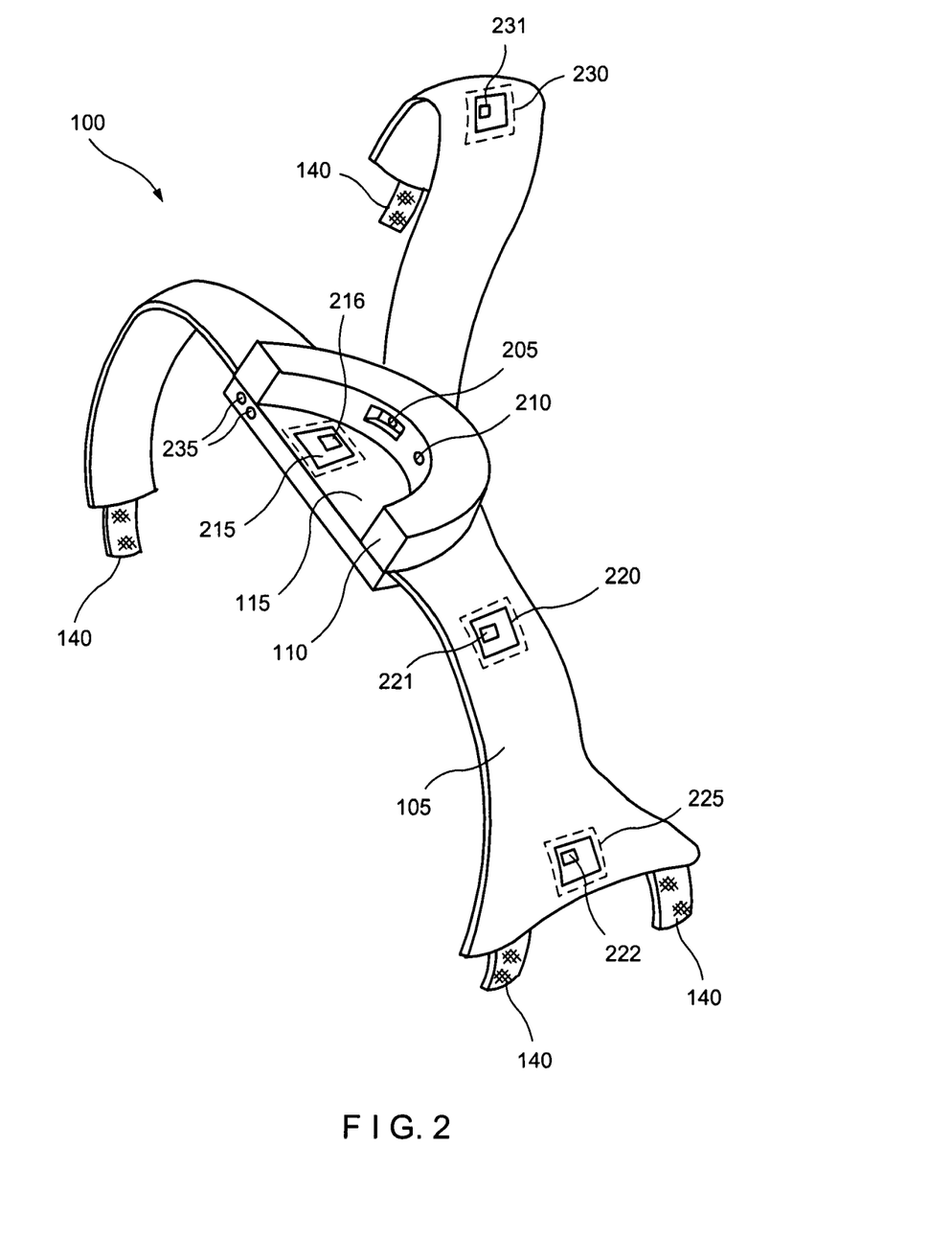
FIG. 2 shows an exemplary embodiment of a holder according to the present invention.

FIG. 2 shows an exemplary holder 100 according to the present invention. Wearable component 105 may be formed into any number of shapes and articles capable of attaching holder 100 to a user (i.e. gloves, belts, headsets, sleds, ring holders, wrist holders, etc.). Wearable component 105 may utilize attachment areas 140 to secure holder 100 to the user (i.e., Velcro®, buckles, magnets, etc.). Wearable component 105 may provide for embedded electronic devices to reside within the fabric or other material used as part of wearable component 105. Preferably, holder 100 is relatively inexpensive so that it may be mass-produced and distributed to a number of users.

The dock 110 is integrally attached to wearable component 105 such that the user remains unencumbered when system 180 is in the coupled state. Dock 110 may be molded in any shape capable of receiving attachment component 125. Attachment component 125 may couple to dock 110 by plugging into an electrical outlet on dock 110, snapping into place, etc. According to the present invention, dock 110 may also communicatively couple with attachment component 125 via a wireless connection (e.g., attachment component 125 scanning a barcode on holder 100).

An exemplary holder 100 may contain controllers 215, 220, 225 and 230, each holding a memory device, 216, 221, 222, and 231 respectively. A memory device according to the present invention may be, for example, a hard drive, Flash memory, memory card, RFID tag, etc. In one exemplary embodiment according to the present invention, an embedded controller may contain a non-volatile memory (EEPROM). It may be understood by those skilled in the art that the present invention may comprise a plurality of memories within or without controllers as part of holder 100.

According to an exemplary embodiment of the present invention, dock 110 may contain controller 215 comprising memory device 216. Wearable component 105 may also contain controller 220 comprising memory device 221. The quantity and dimension of embedded controllers/memories within either wearable component 105 or dock 110 may be, for example, limited only by the physical dimensions of holder 100. In an exemplary embodiment according to the present invention, memory of holder 100 may be sewn into wearable component 105. Memory of dock 110 may communicate with the memory of wearable component 105.

Controllers 220 and 215 may be capable of interacting (i.e. providing for data exchange between their respective memories), despite their location on holder 100. For example, controller 220 may be embedded within a section of the fabric of wearable component 105, while controller 215 may be located in dock 110. The interaction between memory devices 216 and 221 may be through wired, wireless, etc., coupling between controllers 215 and 220. According to the present invention, any number of controllers may be electrically or wirelessly coupled, so long as such coupling does not unduly encumber the user.

Since the present invention may apply to any number of wearable component styles, there may exist controller configurations which may not permit electrical coupling between all the embedded controllers in the holder 100. Referring to FIG. 2, controller 215 and controller 230 may be located in such a way that electrical coupling between memory device 231 and 216 may encumber the user. According to FIG. 2, controller 230 may be in a distal portion of a strap of a strap-style wearable component. According to the present invention, distally located controller 230 may still communicate with controller 215 in dock 110. However, the memory devices 216 and 231 may interact via other device interaction methods known to those skilled in the art (e.g., Bluetooth, RFID). Thus, distal controllers (i.e. 230) may wirelessly communicate with memory devices 216, 221, and 222 which may be located elsewhere on holder 100. In this way, users have access to all memories regardless of the location of the controllers and physical configuration of wearable component 105 and dock 110.

In another embodiment according to the present invention, the memory within holder 100 may be configured based on the type of connection between attachment component 125 of mobile computer 150 and dock 110. In an exemplary embodiment according to the present invention, the dock may be configured to determine which memory device to use depending on the type of coupling at dock 110. Referring to FIG. 2, attachment component 125 may be received at any combination of receiver portions (e.g., receiver portions 115, 205 and/or 210). For instance, dock 110 may limit mobile computer 150 access to memory device 216 when the mobile computer 150 is coupled to receiver portion 205. Alternatively, dock 110 may limit mobile computer 150 access to memory device 221 when the mobile computer 150 is coupled to receiver portion 210. In this way, a particular memory device in holder 100 may be selected based on the type of coupling that exists between component 125 and dock 110.

Interaction between memory devices may be monitored and configured when holder 100 is detached from mobile computer 150. In this embodiment of the present invention, the user may select which memory device is to be used, for example, via a selection toggle 235. Alternatively, holder 100 may receive commands from remote applications (i.e. server instructions via 802.11 networks, signals from another mobile, wearable system 180, etc.). The memory devices 216, 221, 222, and 231 may also automatically recognize which memories to make active depending on prior user settings, algorithms, commands, etc. In yet another exemplary embodiment of the present invention, the mobile computer 150 may control the selection of and interaction between memory devices 216, 221, 222 and 231.

Figure 3:
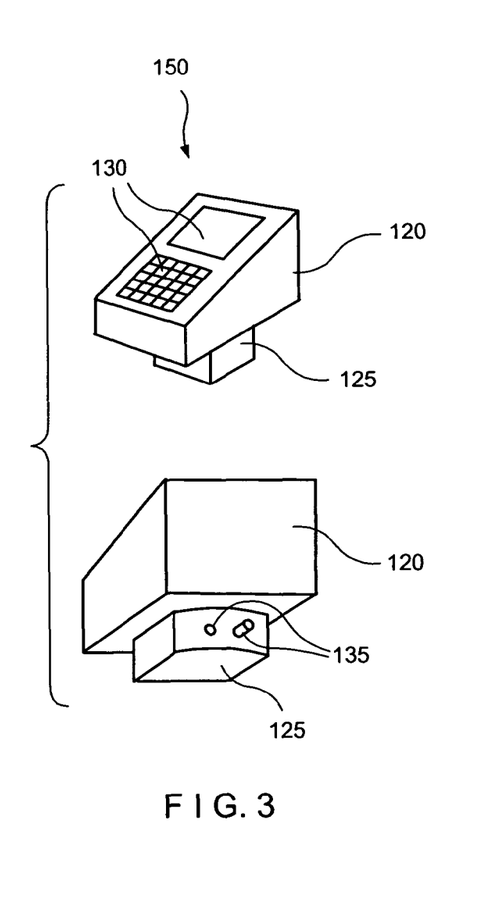
FIG. 3 shows an exemplary embodiment of a mobile computer according to the present invention.

An exemplary mobile computer 150 according to FIG. 3 comprises a housing 120 molded to contain components such as memory, processors, communication arrangements, etc. A user may operate the components within housing 120 via a data-input arrangement 130. An exemplary implementation 130 according to the present invention may be an application-programming interface allowing an application program writer to write code that will access the memory. According to the present invention, an exemplary data-input arrangement 130 allows for system 180 operation using very few keys and smaller displays, as much of the setup and functionality will be automatic. In this way, users may operate system 180 by merely coupling mobile computer 150 and holder 100, and avoid having the user navigate and enter data with a smaller number of device inputs. The present invention may also include numerous other embodiments of housings and data-input arrangements for use on mobile computers known to those skilled in the art.

Attachment component 125 may be molded in any shape capable of reception within dock 110. The attachment component 125 may be disposed in any location on mobile computer 150 which provides for coupling with dock 110. In an exemplary embodiment of mobile computer 150, attachment component 125 includes a connection array 135 to be received within receiver portion 205 and/or receiver portion 210. Once attachment component 125 is received in dock 110, system 180 is physically coupled and permits communication between mobile computer 150 and holder 100.

An exemplary connection array 135 may be an electrical jack capable of plugging into a receiver portion 205 or 210. According to this embodiment of the present invention, connection array 135 creates an electrical coupling between mobile computer 150 and holder 100. In this way, attachment component 125 enables a physical coupling of system 180 and provides communication (i.e. via electrical signals) between mobile computer 150 and holder 100.

In yet another embodiment, the connection array 135 may be a bar code scanned by dock 110. According to this embodiment, mobile computer 150 may initiate wireless communications with holder 100 after the bar code is scanned and verified. In this way, attachment component 125 provides physical coupling for system 180, but mobile computer 150 and holder 100 may communicate wirelessly.

Figure 4:
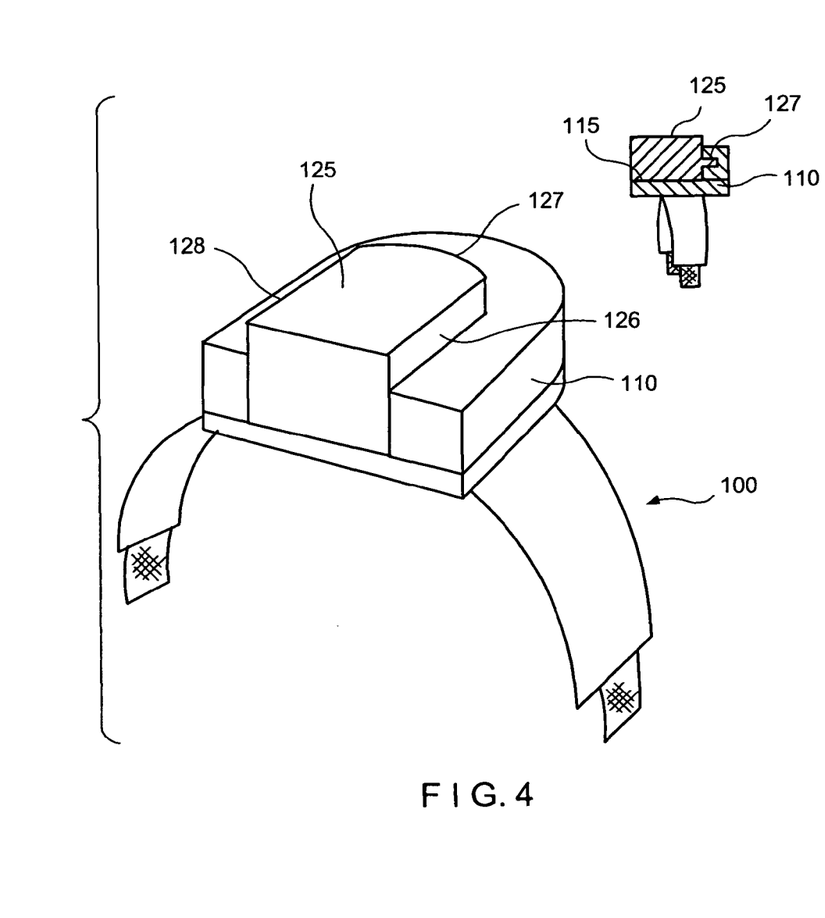
FIG. 4 shows an exemplary embodiment of a mechanical arrangement of the holder and the mobile computer according to the present invention.

FIG. 4 shows an exemplary embodiment of a mechanical arrangement of the attachment component 125 with holder 100. In this embodiment, attachment component 125 may comprise several receiving surfaces 126, 127, and 128. Dock 110 may be formed to complement receiving surfaces 126, 127, and 128. In one embodiment, surfaces 126, 127, and 128 may create a friction fit between dock 110 and attachment component 125. In yet another embodiment, the surfaces 126, 127, and 128 may magnetically attach to the inner surface of dock 110. In an alternate embodiment, surface 127 may be received in a recess of dock 110. Those skilled in the art may understand that numerous mechanical arrangements may be achieved between attachment component 125 and holder 100 where contact with a surface of the attachment component 125 occurs.

In an exemplary mechanical arrangement, dock 110 allows electrical connectivity, wireless communication, etc., between mobile computer 150 and holder 100. According to this embodiment of the present invention, user activity taking place at the data-input arrangement 130 or toggle 235 may operate any component of system 180. In one embodiment, a user can access components of holder 100 (i.e. memory, controllers, power, etc.) via data-input arrangement 130. Thus, devices and device capabilities belonging exclusively to mobile computer 150 or holder 100 become accessible to both devices when system 180 is in a coupled state.

In its coupled state, system 180 may be able to perform operations that neither mobile computer 150 nor holder 100 could do individually. For example, access to an 802.11 wireless network may require an 802.11 capable device found only within mobile computer 150. Further, access to the network may require a wireless network key which may be stored in holder 100. According to the present invention, mobile computer 150 may gain access to a network (i.e. restricted/confidential areas) using the holder 100 as a key.

In another embodiment, data-input arrangement 130 may act as an RFID interrogator when system 180 is in its coupled state. Using holder 100 as an RFID tag, data-input arrangement 130 may gain access to another RFID interrogator by allowing holder 100 to be scanned. Alternatively, data-input arrangement 130 may gain access to otherwise restricted areas after scanning holder 100.

System 180 may possess a functionality (i.e., a scanning system for users who scan products, a database search system for customers who seek sale items, etc.). This functionality may include a range of operations capable of being performed based on the type of user of the system. In one exemplary embodiment, functionality may be based on memory of either one or both of mobile computer 150 and holder 100. Information to establish functionality may be stored in memory and implemented seamlessly when system 180 is in its coupled state. In an alternate embodiment, functionality of the user may be stored over a network and only the user ID may be stored in the holder In one exemplary embodiment, the functionality of system 180 may be based on a memory within holder 100. According to this embodiment, any mobile computer 150 may couple to holder 100 and achieve the same system 180 functionality, regardless of the previous mobile computer's use. Thus, a user may wear the same holder 100 and use multiple mobile computers 150 at their convenience to perform the same job task. According to the present invention, the user will experience nominal down time when replacing mobile computers 150 due to a discharged, non-replaceable battery, discharged rechargeable battery, or damaged hardware, for a mobile computer 150 with different hardware (e.g., LASER scanner, RFID reader, various WAN radios, LAN, different user inputs and displays.)

According to an embodiment of the present invention, system 180 in its coupled state may automatically initiate applications specific to the user. Most important concept Automatic applications may include set-up of custom user-interfaces, user-authentication, network connections, etc. Custom user-interfaces may include display screen lighting schemes, scanning configurations, e-mail, account information, etc. In an exemplary system 180, when mobile computer 150 of a stock person is snapped into their holder 100, a product stocking application will automatically start. In another exemplary embodiment, mobile computer 150 of a customer will initiate a price check application when snapped into the customer's holder 100. In a further exemplary embodiment, a supervisor application will stat when mobile computer 150 is snapped into a supervisor's holder 100. Those skilled in the art may recognize the present invention contemplates numerous applications which may automatically start upon system 180 achieving a coupled state.

Figure 5A:
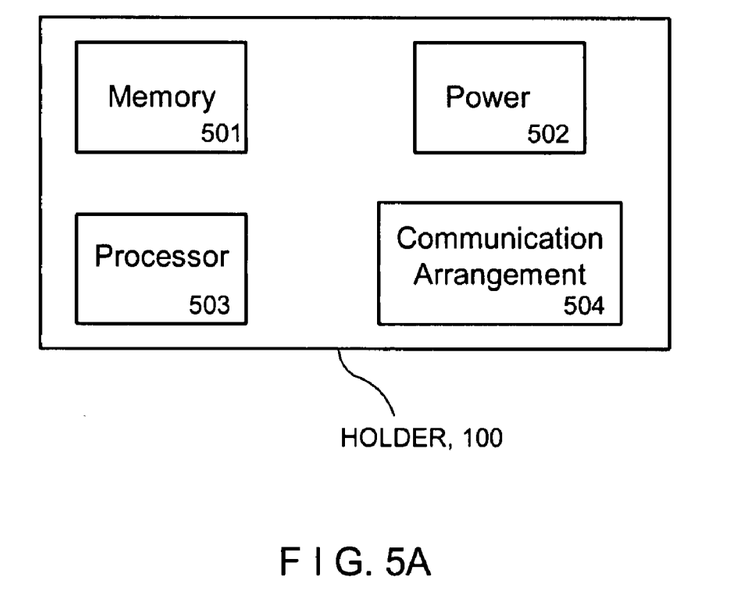
FIGS. 5A and 5B shows an exemplary embodiment of components of a holder and components of a mobile computer according to the present invention.
Figure 5B:
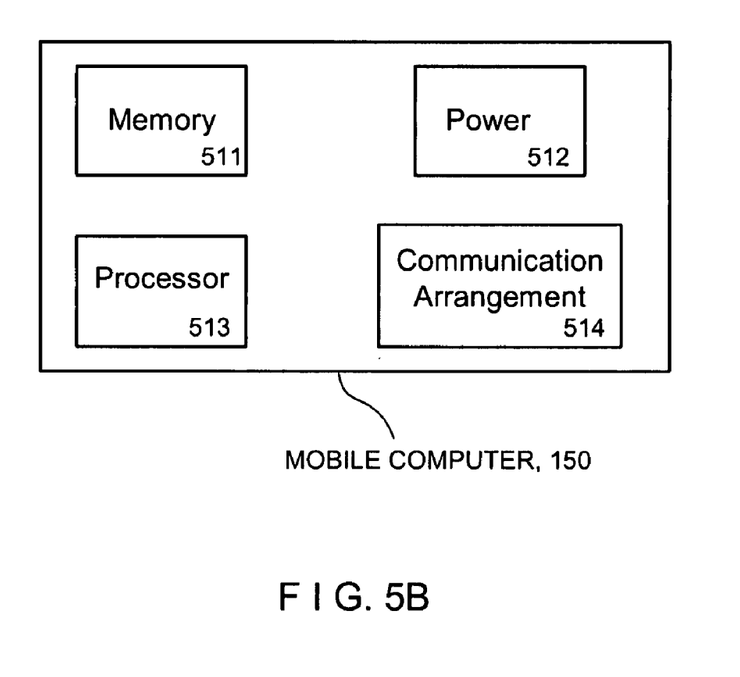

FIGS. 5A and 5B illustrate exemplary embodiments of a mobile computer 150 and holder 100 in diagram form. FIG. 5A illustrates holder 100 in block diagram form. FIG. 5B illustrates mobile computer 150. In accordance with the present invention, FIG. 5B may illustrate any type of mobile computer 150 compatible with holder 100.

Holder 100 may comprise a memory device 501, a power source 502, a processor 513, and a communication arrangement 504. According to the present invention, power source 502 may be a battery. An exemplary power source 502 may be inexpensive, disposable batteries that can be disposed of with an inexpensive holder. In another embodiment of the present invention, power source 502 may be a smart battery (e.g. a battery with memory). According to this embodiment, smart battery memory comprises only battery-related data, but smart battery memory may still be accessed by memory device 501 in accordance with the present invention.

Mobile computer 150 may comprise a memory 511, a power source 512, a processor 513 and a communication arrangement 514. Memory 511 may comprise, for example, one or more databases (or other data storage mechanisms) for storing user configuration settings (i.e., identification information, custom user-settings, wireless protocols, etc.). According to the present invention, mobile computer 150 may rely on power from an internal battery, external power, etc. Communication arrangement 514 may include wireless and wired communications arrangements known by those skilled in the art.

An exemplary communication arrangement 504 may provide coupling with mobile computer communication arrangement 514 via electrical, wireless, etc., connection. Additionally, communication arrangement 504 may also provide similar coupling with memory of holder 100. Communication arrangement 504 may comprise an electrical coupling between memory 501 and dock 110. In another exemplary embodiment, communication arrangement 504 may comprise wireless communications such as 802.11 protocol, Bluetooth, RFID etc., to couple holder 100 to a network or another system 180. In this way, holder 100 may provide functionality data from remote locations other than memory 501.

In a coupled state, system 180 may provide for the transmission of data to and from mobile computer 150 and holder 100 via communication arrangements 504 and 514. System 180 may instruct mobile computer 150 to read/write information to memory 501. Alternatively, system 180 may provide for holder 100 to read/write information to memory 511.

In one exemplary embodiment, memory 501 and power 502 may be electrically coupled to the memory 511 and power 512 such that only two (2) electrical connections exist between the components. According to this embodiment, one electrical coupling may be between power sources 502 and 512 and a General Purpose Input/Output ("GPIO") bidirectional communication between memories 501 and 511. In yet a further embodiment, memory 501 may electrically couple to a plurality of memories 511 that may be both electrically coupled to holder memories or communicatively coupled via communication arrangement 514.

According to an exemplary embodiment of the present invention, system 180 may choose which components of mobile computer 150 and holder 100 to initialize and/or operate. For example, system 180 may utilize processor 503 and 513 but may limit which memory to process data from (i.e. read/write only from holder memory 501).

An operation mode for system 180 comprises all data/information which derives from user interaction with the functions of system 180 (i.e. user commands, scanning routines, etc.). The operation mode may relate to the functionality of system 180 or be selected by the user. Each operation mode may be stored on memory 501 or other storage locations via communication arrangement 504.

In an exemplary embodiment according to the present invention, a first mobile computer 150 may be set to the exact operation mode of a previous mobile computer 150 when coupled to memory 501. System 180 may seamlessly achieve this previous operation mode stored on memory 501 when in the coupled state. In an exemplary embodiment of the present invention, a first mobile computer 150 may read operation mode data (e.g., captured bar code or RFID data) on memory 501 and automatically communicate applications associated with that mode to memory 511. In this way, system 180 may be brought to the same point in the application reached by a prior mobile computer 150.

In another exemplary embodiment, user settings that were saved within holder 100 may be reinitiated even if the current functionality of mobile computer 150 differs from that of a previous mobile computer. According to this exemplary embodiment, holder 100 can communicate user settings regardless of a prior mobile computer 150 use. For example, a first mobile computer 150 may have been attached to holder 100 and used as a price checking device by a customer. When the customer switches from the first mobile computer 150 to a second mobile computer 150, price check settings, items on sale, purchases, etc., would be rendered on the second mobile computer 150. The second mobile computer 150 would render the settings of the first mobile computer 150 regardless of whether the second mobile computer 150 had been used for price checking. Holder 100 data such as scan times, back light defaults, data capture modes, trigger and button preferences, etc., may be rendered on data input arrangement 130 without any reduction in user-service. Thus, the present invention reduces the time, battery, and convenience costs associated with redefining subsequent mobile computers 150.

Figure 6:
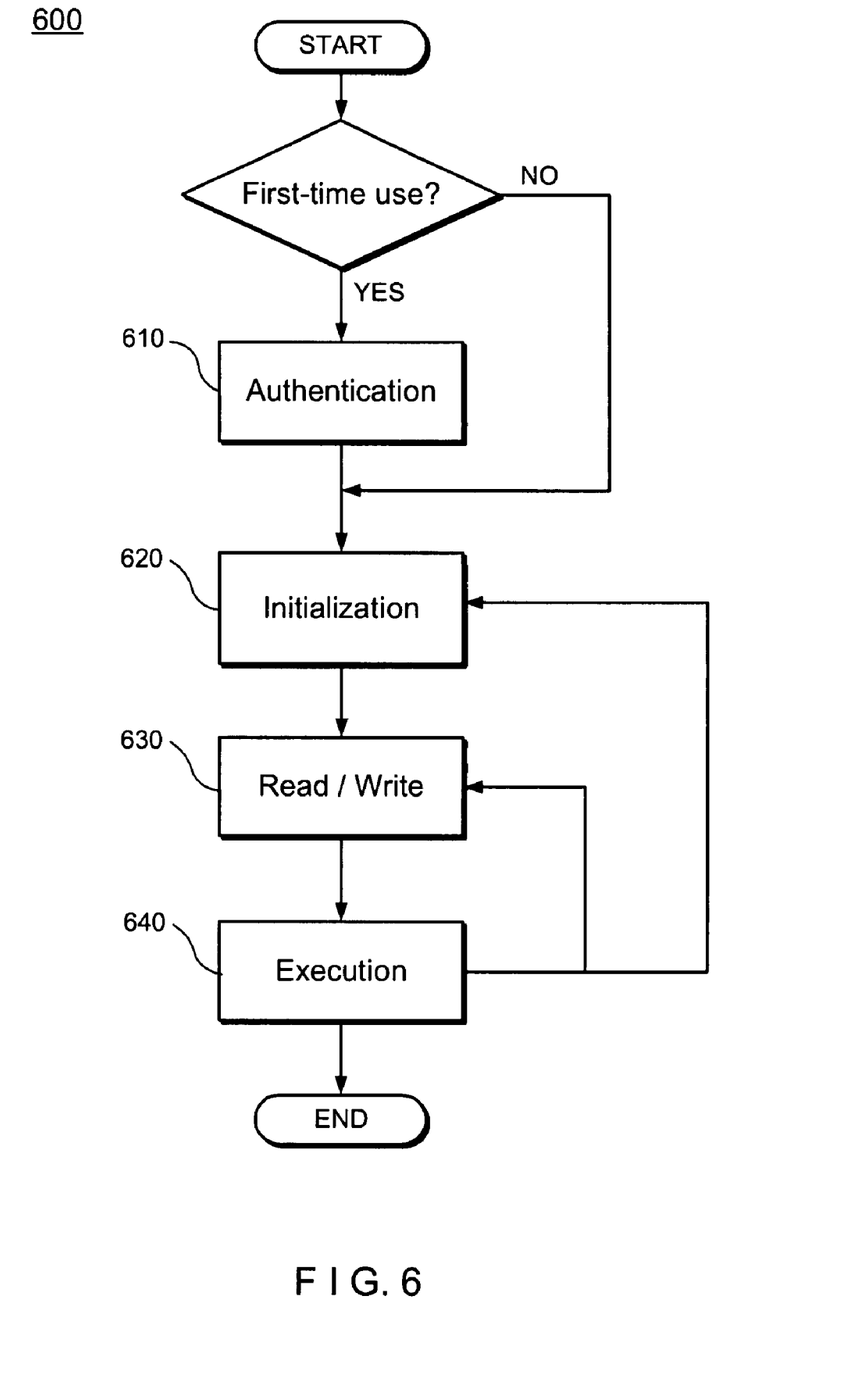
FIG. 6 shows an exemplary embodiment of a method of communication between a mobile computer and a holder according to the present invention.

FIG. 6 illustrates an exemplary embodiment of a method 600 of communication between mobile computer 150 and holder 100 when system 180 is in a coupled state. In one embodiment, mobile computer 150 and holder 100 may be in use for the first time, and therefore, system 180 runs an authentication step 610. In one exemplary embodiment of an authentication step according to the present invention, mobile computer 150 may seek out identity information from memory 501 (e.g., user identity in the form of screen names, photo identification, voice recognition, etc.). For example, mobile computer 150 confirms a match between an access code on mobile computer 150 and in memory 501. In another exemplary authentication step 610, holder 100 may be authenticated remotely (i.e., over an 802.11 network, by another system 180, etc.). According to this embodiment, system 180 authentication may occur by authenticating IP addresses, WEP keys, MAC address, etc. Alternatively, the authentication step may occur automatically/seamlessly upon system 180 entering a coupled state. In an embodiment of the present invention, employees wearing their systems 180 on duty can be identified to other mobile computers 150 as being available to help customers, clean up a spill, etc. In yet another embodiment of the present invention, employees wearing their systems 180 can be identified in a phone directory as being "on line" over a Voice over IP system ("VoIP").

Following authentication step 610, an initialization step 620 may involve initializing either mobile computer 150, holder 100, or system 180. According to the present invention, the initialization step may occur automatically and/or seamlessly. In an exemplary initialization step 620, mobile computer 150 and/or holder 100 may run a diagnostic test for network access, software updates, power supply checks, etc. In another exemplary initialization step 620, mobile computer 150 couples to holder memory 501 to begin storing and receiving data/information therefrom. According to this embodiment of the present invention, mobile computer 150 may seek out application data from holder memory 501, process application data via processor 513, and initialize the applications for system 180. System 180 may require initialization 620 only when it achieves a coupled state for the first time.

According to one exemplary embodiment, system 180, upon re-entering a coupled state, may bypass authentication step 610 and perform initialization step 620. For example, a user may have already authenticated holder 100 and need not repeat authentication step 610 for further mobile computers 150. Alternatively, a user may have authenticated mobile computer 150, and by doing so, provide authentication for subsequent holders 100 coupled thereto. In this way, authentication of a single holder 100 or mobile computer 150 may be transferred to either one when system 180 achieves a coupled state.

In an exemplary read/write step 630, the mobile computer memory 511 reads data and information stored on holder memory 501. Alternatively, mobile computer 150 may write data and information onto memory 501 to be accessed later during system 180 operation. Mobile computer 150 may perform the read/write step 630 on any one of a plurality of holder memory devices or similar storage devices coupled thereto. In an exemplary embodiment according to the present invention, mobile computer 150 may read the product information stored on holder 100, store the product information within memory 511 and store the product information in an online database on a network. Mobile computer 150 may also write functionality and operation mode data to memory 501 for subsequent holder 100 use.

In an exemplary execution step 640 according to the present invention, mobile computer 150 may respond to the processing of information and data stored on memory 501. Processor 513 may convert files stored on memory 501 into a compatible format, interpret bar code entries or other source data, print charts derived from an algorithm, etc. According to the present invention, system 180 may accomplish execution step 640 via mobile computer 150, holder 100, or a network device. Following step 640, system 180, in a coupled state, may choose to read/write additional data and/or authenticate via steps 630 and 620 respectively.

Figure 7:
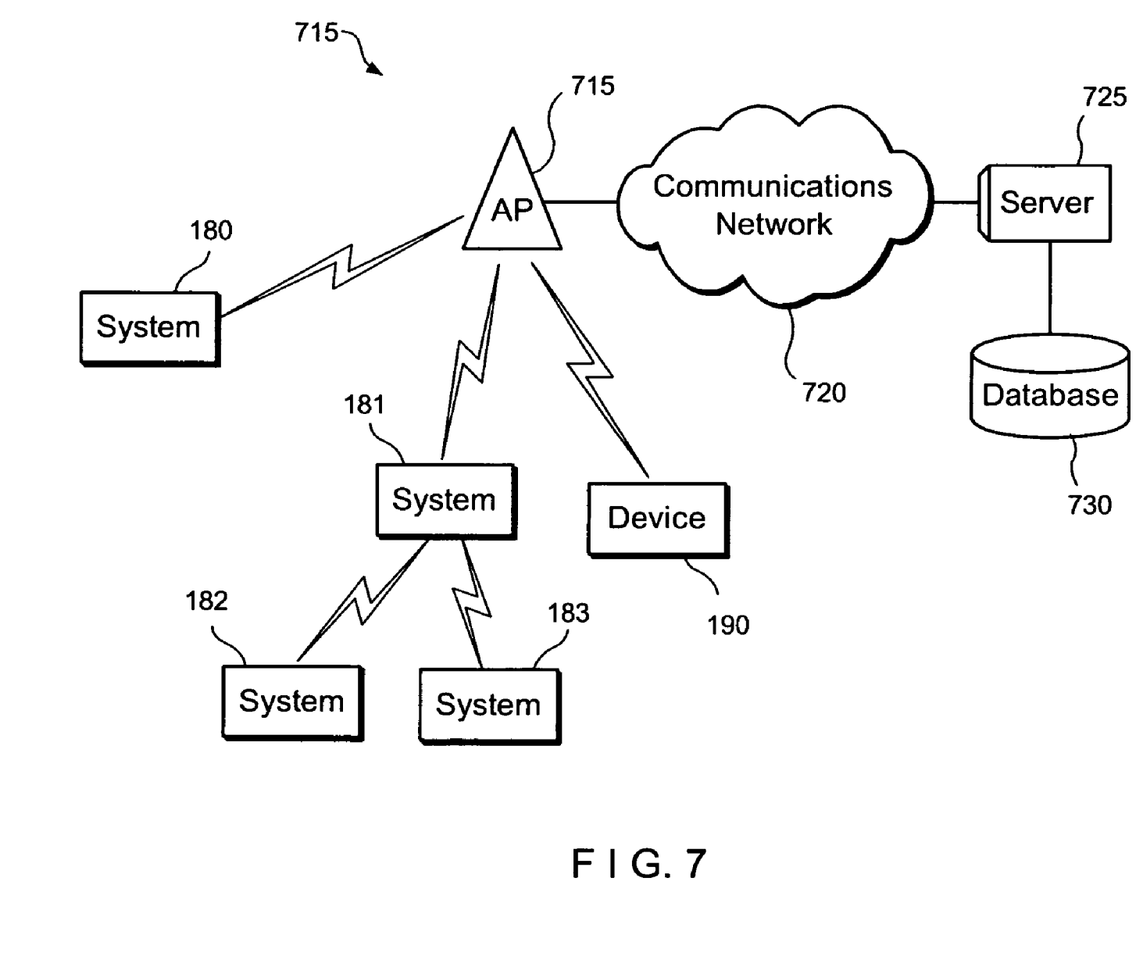
FIG. 7 shows an exemplary embodiment of a network of systems according to the present invention

FIG. 7 illustrates an exemplary embodiment of a network 700 wherein a user may communicate with other devices which are communicatively coupled to an access point (AP) 710. The AP 710 may provide communicative coupling between a plurality of systems according to the present invention (i.e. systems 180, 181, 182 and 183). AP 710 may also communicate with server 725 and database 730 over a communications network 720. An exemplary network 700 may also include another communicatively coupled device 190 (e.g., laser based scanners, image based scanners, RFID devices, PDAs, mobile phones, portable game consoles, laptops, etc.).

In an exemplary embodiment of the present invention, system 180 communicates wirelessly with system 181 and device 190. The user of system 180 may be notified (i.e. via VoIP system, e-mail, audible signal, etc.) once system 181 begins operating. Alternatively, device 190 may communicate the existence of systems 180 and 181 as being "online." According to this embodiment, users of different systems may track, locate, and identify new systems communicating on the network, communicate with those systems, view system information, etc.

In yet another exemplary embodiment of network 700, certain systems may permit being grouped together based on their mobile computer 150 and/or holder 100. For example, holder 100 of system 180 may contain identification information which conveys system 180 operation mode, user tasks, functionality, user identity, etc. AP 715 may communicate this information to server 725 which initiates a search in database 730 (i.e. a system task database, system function group database, etc.). Subsequent communications with server 725 may instruct AP 715 to group system 180 with system 181. Alternatively, AP 715 may be preprogrammed to group system 180. According to the present invention, device 190 may also be grouped with systems 180 and 181 based on the information stored therein.

Once a group of systems exists, the functionalities, operation modes, access grants, tasks, etc., specific to any one system/device in the group may be established for each system/device in the group. Additionally, communications between systems/devices in a group may be exclusive for that group as opposed to other groups on network 700. In one embodiment, a group comprised of systems 180, 181, and 182, may have a system 180 authorized to access a restricted area. According to the present invention, the access granted to system 180 may be established for systems 181 and 182.

According to the present invention, groups of systems may all be capable of receiving the same communication from sources on network 700 (i.e. a central server, managing computer, etc.). In an exemplary embodiment according to the present invention, pages may be broadcast over VoIP systems from a supervisory computer (i.e. a server 725) to a group comprised of systems worn by "Outside Garden Department" employees. The broadcast to this group to help a customer in "isle 5" would be received by only that group and would not appear on other systems/devices outside of the group. In a further exemplary embodiment according to the present invention, a group comprised of customer systems may receive broadcast pages containing price updates for products from the store computer, but the same communication would not be communicated to employee systems/devices.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A system, comprising:
   a holder including a wearable component,
   a dock coupled to the wearable component;
   a memory coupled to the dock;
   a computing device removeably coupled to the dock, the computing device receiving from and storing data to the memory, the data capable of causing the coupled computing device to automatically adopt a mode of another computing device coupled to the dock at a different time; and
   wherein the computing device includes an attachment component, the attachment component and the dock couple via a communication arrangement.

2. The system according to claim 1, wherein the memory is located within the wearable component.

3. The system according to claim 1, wherein the communication arrangement is one of a connection array and a wireless connection.

4. The system according to claim 1, wherein the communication arrangement includes at least one of a bar code reader and a scanner.

5. The system according to claim 1, wherein the adopted mode occurs seamlessly when the attachment component couples to the memory.

6. The system according to claim 1, wherein the adopted mode is a user-specific application, the user-specific application being at least one of a stocking application, a price check application and a supervisor application.

7. The system according to claim 1, wherein the coupling of the holder and the computing device creates a coupled state by which both cooperatively operate.

8. The system according to claim 7, wherein the holder achieves a holder functionality that did not exist in an uncoupled state.

9. The system according to claim 8, wherein the holder functions as at least one of an identification key and an emulator of an RFID tag.

10. The system according to claim 7, wherein the computing device achieves a computing device functionality that did not exist in the uncoupled state.

11. The system according to claim 10, wherein the computing device functions to receive broadcast pages.

12. A method, comprising:
    storing data in a second device component, wherein the data is specific to a first device component; and
    executing the data on the second device component, the second device component exhibiting a mode stored in a memory of the first device component.

13. The method according to claim 12, further comprising authenticating the first device component and the second device component when in the coupled state.

14. The method according to claim 13, wherein the authenticating of the first device component and the second device component in the coupled state is based on data in the first device component.

15. The method according to claim 14, wherein the authenticating of the first device component occurs over a communication network.

16. The method according to claim 13, wherein the authenticating occurs automatically upon coupling of the first device component and the second device component.

17. The method according to claim 12, further comprising initializing the first device component and the second device component when in the coupled state.

18. The method according to claim 17, wherein the initializing of the first device component and the second device component occurs seamlessly.

19. A method, comprising:
    coupling a first computing device to a dock;
    setting the first computing device to a first mode;
    storing the first mode in a memory in communication with the dock;
    coupling a second computing device to the dock; and
    setting the second computing device to the first mode.

20. The method according to claim 19, further comprising: reading and writing data to the memory of the first device.

21. The method according to claim 20, wherein the data includes at least one of (i) data originating from the first computing device and (ii) data collected from the second computing device.

22. The method according to claim 19, wherein the first mode establishes a first functionality and the second mode establishes a second functionality, the first and second functionalities being based on the first and second computing devices.

23. The method according to claim 19, wherein the setting step occurs seamlessly upon coupling with the dock.

24. A holder, comprising: a wearable component; a dock coupled to the wearable component and capable of docking with a computing device, wherein the computing device includes an attachment component, the attachment component and the dock couple via a communication arrangement a communication arrangement communicating with the computing device; and a memory in communication with the communication arrangement.

25. The holder according to claim 24, wherein the memory is in at least one of the wearable component and the dock.

26. The holder according to claim 24, wherein the dock comprises a receiving surface for receiving the computing device.

27. The holder according to claim 26, wherein the receiving surface achieves a substantially rigid coupling between the holder and the computing device.

28. A system, comprising:
    a holding means including a wearable component,
    a docking means coupled to the wearable component;
    a memory means coupled to the dock; and
    a computing means removeably coupled to the dock, the computing means receiving from and storing data to the memory, the data capable of causing the coupled computing means to automatically adopt a mode of another computing means coupled to the docking at a different time; and
    wherein the computing means includes an attachment component, the attachment component and the docking means couple via a communication arrangement.

* * * * *